Jan. 4, 1944.    J. LOXHAM    2,338,190
LINEAR-DIMENSION GAUGE OR COMPARATOR
Filed June 21, 1941    6 Sheets-Sheet 3

INVENTOR:
JOHN LOXHAM
BY
Haseltine Lake & Co.
ATTORNEYS

INVENTOR:
JOHN LOXHAM
BY
Haseltine, Lake & Co.
ATTORNEYS

Jan. 4, 1944.    J. LOXHAM    2,338,190
LINEAR-DIMENSION GAUGE OR COMPARATOR
Filed June 21, 1941    6 Sheets-Sheet 6

INVENTOR:
JOHN LOXHAM
BY
*Haseltine, Lake & Co.*
ATTORNEYS

Patented Jan. 4, 1944

2,338,190

UNITED STATES PATENT OFFICE 2,338,190

LINEAR-DIMENSION GAUGE OR COMPARATOR

John Loxham, Letchworth, England

Application June 21, 1941, Serial No. 399,064
In Great Britain June 27, 1940

18 Claims. (Cl. 33—147)

This invention relates to linear-dimension gauges or comparators its chief object being to evolve an improved linear-dimension gauge by means of which pieces to be measured may be readily compared with a standard measure, the results obtained being more highly accurate than those obtainable by similar instruments hitherto in use.

According to the invention the instrument comprises a measuring anvil or the like adapted to move in a fixed straight path, the said measuring anvil being combined with means for translating its linear motion into a rocking motion of a member which is adapted to cause by its rocking motion the actuation of means whereby a shaft or spindle carrying a pointer is caused to rotate in such a manner that the radial angular movement of the pointer is within very fine limits directly proportional to the linear movement of the measuring anvil. The said means for translating the linear motion of the measuring anvil into a rocking motion may comprise a movable frame or the like adapted to move under the action of resilient means along a fixed straight path parallel with the fixed straight path along which the measuring anvil is adapted to move, movement of the said movable frame being normally prevented by contact between it and the measuring anvil or a member connected therewith but being permitted when the measuring anvil moves, the movable frame having associated therewith a flexible strip or like element whereto is connected a connecting member adapted to be connected also to a second flexible strip which is associated with a second frame or the like, the said second frame being immovable, and the arrangement being such that if the movable frame is caused to move along its fixed path the said connecting member is caused to rock. The said connecting member may have associated with it a pair of arms or like elements to each of which is attached a flexible belt or other similar device, the arrangement being such that if the connecting member is caused to rock, a motion of the said pair of arms ensues whereby a shaft or spindle carrying a pointer is caused to rotate by means of the flexible belts so that a radial angular movement is imparted to the said pointer. The said pointer may be adapted to co-operate with a suitable scale so that accurate measurements of the minute movements of the measuring anvil may be made; or the said flexible strip associated with the movable frame, or the said connecting member, or the said shaft or spindle, may carry a mirror adapted to receive a beam of light from a suitable source, which beam, by means of a system including an additional mirror or additional mirrors, is projected on to a screen or the like to provide a reading; or the said pointer or a similar member may be adapted to carry a pen, whereby a record of measurement readings may be obtained on a movable chart. Preferably the piece to be measured is supported on an adjustable table arranged in a plane at right angles to the path in which the said measuring anvil moves, means being provided whereby the said table can be made alternatively movable for adjustment or locked against movement. Preferably, also, all or most of the indicating mechanism is enclosed in a box or casing having a flush glass front arranged closely adjacent to the said scale wherewith the said pointer is adapted to co-operate.

The use of two frames each carrying a flexible strip, the two flexible strips being joined by a connecting member adapted to rock and thereby to actuate a pointer, has previously been the subject of a patent, No. 1,392,239. The further features hereinafter described, however, are novel, and in combination with the features just mentioned they enable the production of a precision instrument of remarkable sensitiveness and accuracy.

In order that the said invention may be clearly understood and readily carried into effect, the same will now be further described with reference to the accompanying drawings, in which.

Figure 1:
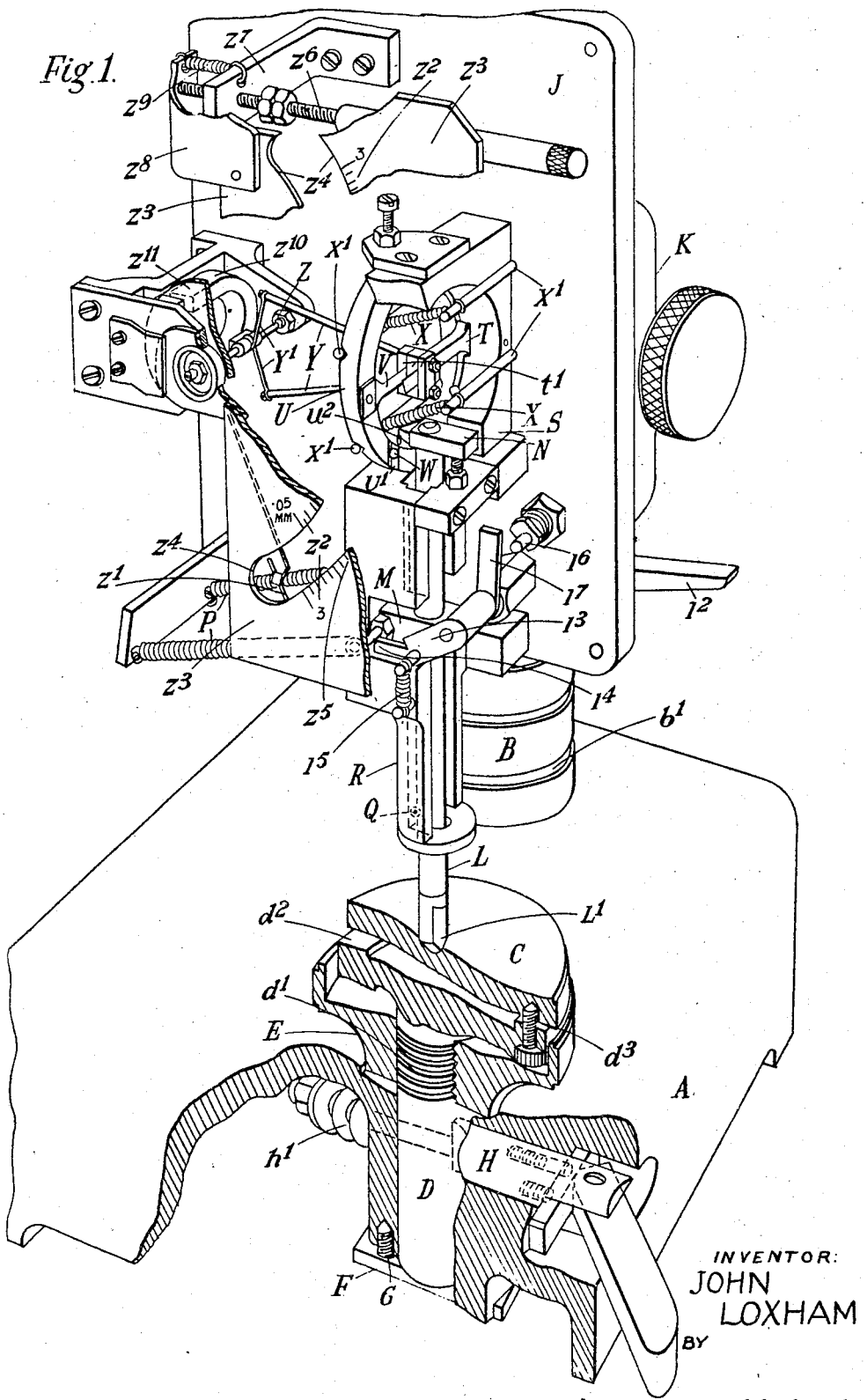
Figure 1 represents an elevation in perspective and partly in section of a linear-dimension gauge exemplifying the invention.
Figure 2:
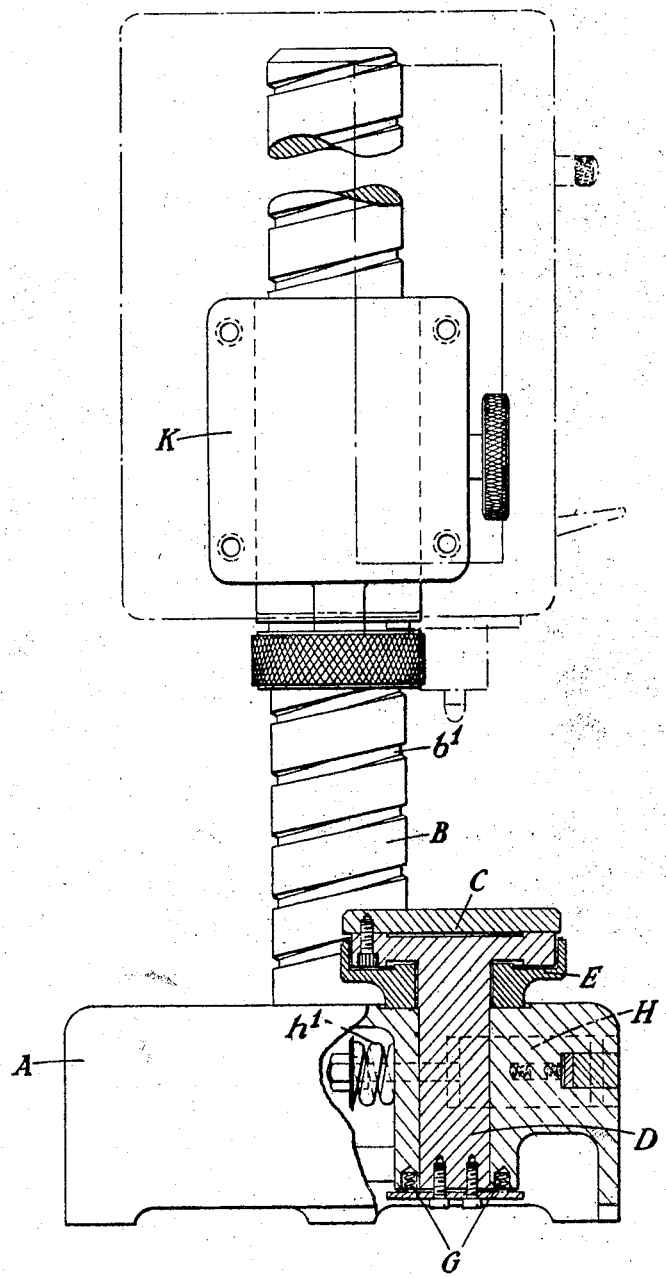
Figure 2 represents in front elevation, partly in section, the base and column.
Figure 3:
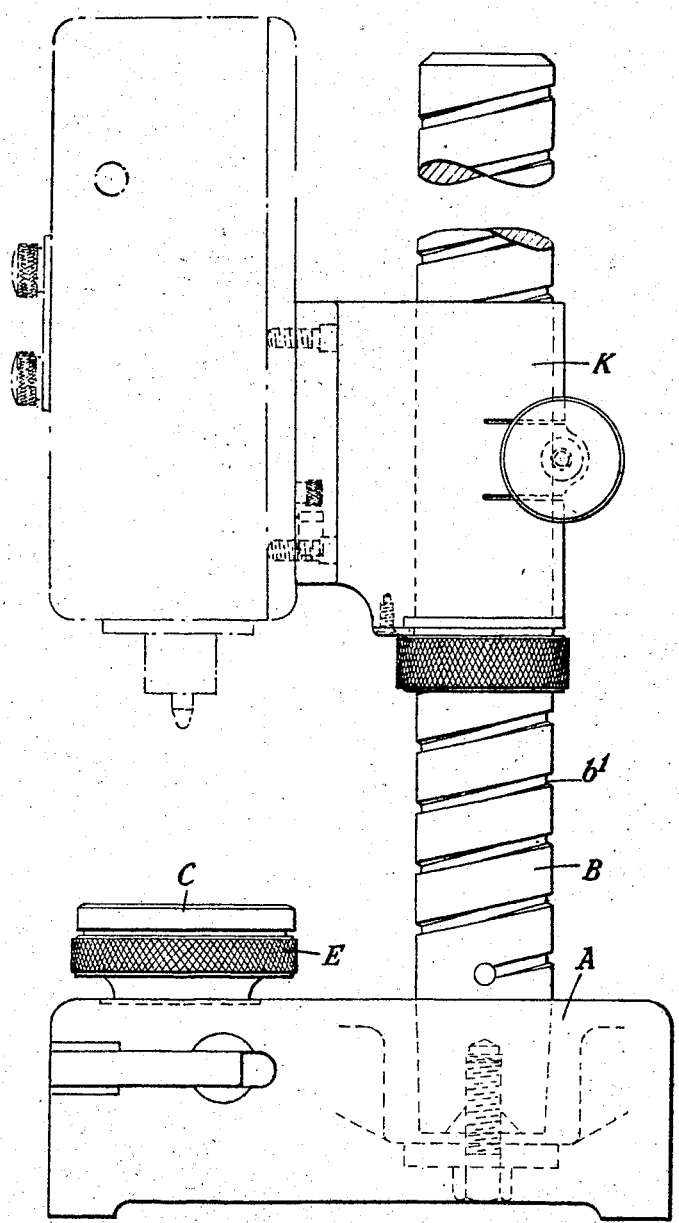
Figure 3 is a side elevation of the base and column taken at the right hand side, viewing Figure 2.
Figure 4:
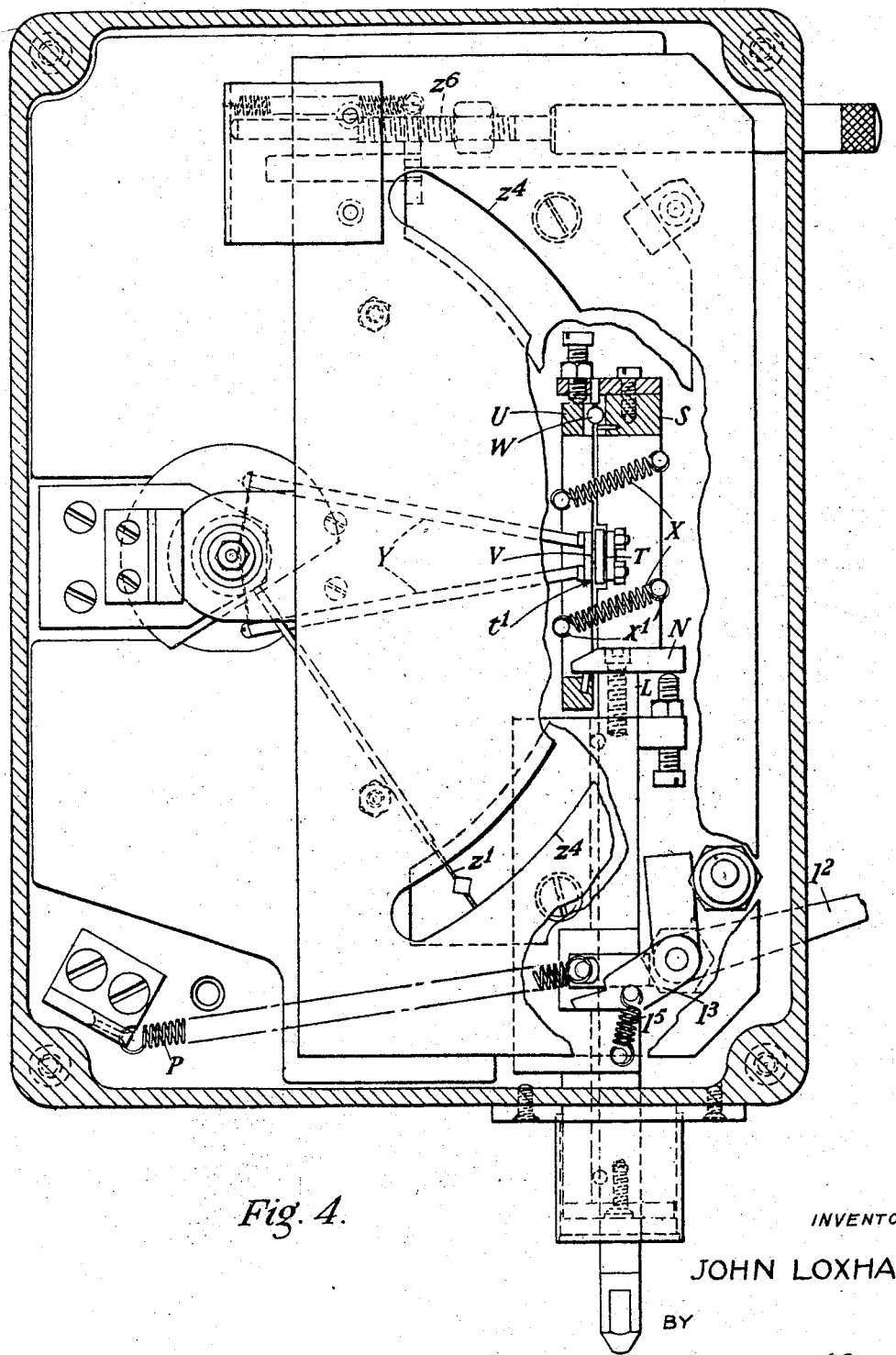
Figure 4 is a front elevation of the measuring and indicating device, a portion of the front plate bearing the scale being broken away to reveal parts of the mechanism.
Figure 5:
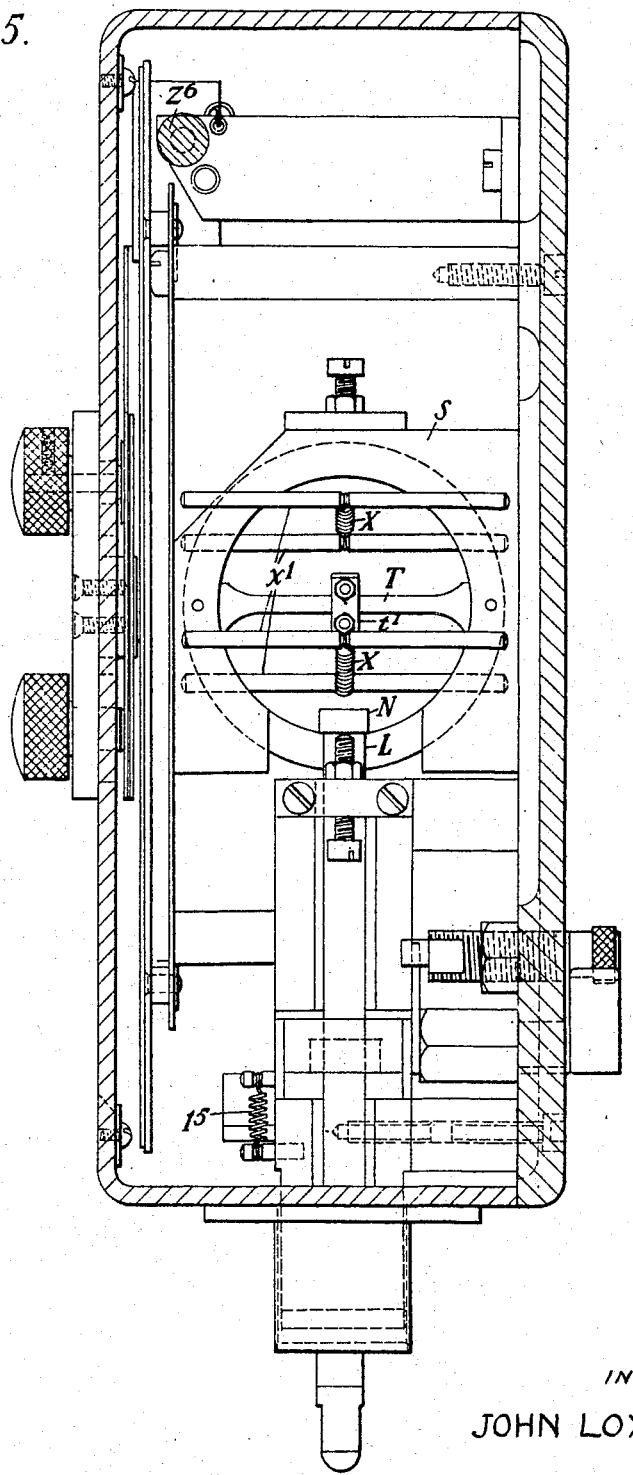
Figure 5 is a side elevation taken at the right hand side in relation to Figure 4.

In this embodiment of the invention, the apparatus comprises a base or stand A to which a column or post B is fitted, which latter is adapted to support the indicating mechanism.

Also mounted on the base is an adjustable table or platform C adapted to support the piece to be measured, said table being so mounted as to be capable of a degree of elevation or depression as required. For example, the table C may have a pillar D associated therewith, said pillar being adapted to project into a suitable socket in the base, and having a threaded portion d' with which a nut E is adapted to co-operate, the arrangement being such that on rotation of the nut E the table C will be elevated or lowered according to the direction in which said nut is rotated.

Rotation of the table C with its pillar D may be prevented by a key F which is attached to the pillar D, this key being arranged to slide into a suitably cut slot in the base A when the table is raised or lowered. In order to eliminate backlash, the flanks of the threads on the nut E and of those on the pillar D are kept in close and constant contact and the lower face of the nut E is kept in close and constant contact with the base A by the force exerted by two springs, one, G, of which is shown, acting one upon each end of the key F. When the table has been suitably adjusted by means of the nut E, it may be clamped in a controlled manner by means of a draw-bolt H accommodated in a suitable slot diametrically transversing the pillar D, which draw-bolt also traverses a part of the fixed base and is continually urged into locking engagement with the pillar D by means of a suitably disposed spring h'. The draw-bolt may be manually withdrawn from its operative position, the withdrawal being effected if desired through the medium of an eccentric or other suitable means adapted to maintain the draw-bolt temporarily in withdrawn position.

Preferably the table C is made in the form of a flat plate as shown, attached to an enlarged portion $d^2$ of the pillar D by means of three suitable screws as $d^3$. If the requirements of the work in hand are such that a specially formed work-holder is desirable to support the work, the table C can be removed and the specially shaped work-holder substituted therefor.

Adjustable arms, stops, or other fittings may, if desired, be mounted on the table C to form a register for locating the part to be measured, so that it may be speedily and accurately measured through any dimension as predetermined.

The indicating mechanism is carried upon a back plate J or similar structure integral with or connected to a rearwardly projecting bracket K or the like which is adapted to co-operate with the column B in such a manner as to support the said mechanism, and also, if desired, to allow vertical adjustment of the mechanism with respect to said column B, means being provided to lock the mechanism in any selected position. If desired, the arrangement may be such that the column B is formed with a coarse screw thread or helical groove $b^1$ and is adapted on actuation of an adjusting ring or the like which co-operates with said thread or groove to be movable vertically either upwardly or downwardly.

A measuring anvil L' is situated at the lower end of a cylindrical plunger L to which is attached a cross-head M and a top plate N. Attached to the cross-head M are two springs P so disposed as to exert a horizontal and a smaller vertical pulling effort on the plunger L. The horizontal pulling effort ensures that the plunger L is kept in close and constant contact with four supporting balls as Q mounted in a channel shaped piece R, which is rigidly fixed to the back plate J and the size of which is so arranged as to ensure that the balls Q are in true rolling contact with the plunger L and the channel piece R, and as a consequence of this the plunger may be moved vertically up or down in a true straight line without play or friction.

Mounted firmly on the back plate J is a frame S in the form, for example, of an annular or preferably a horse-shoe shaped element which is adapted to carry a flexible strip or torsion spring T, said flexible strip being tightly stretched across the frame diametrically thereof. Disposed adjacent to the first frame in such a manner as to be slidable relatively thereto is a second frame U which is preferably annular and which carries a diametrically disposed flexible strip or torsion spring V which latter is adapted, when the frames are parallel and in alignment, to be accurately parallel with and alined with the flexible strip T carried by the first frames. The two flexible strips T and V are suitably interconnected at or adjacent to their centres, by a connecting member $t^1$ which comprises three small plates bolted together.

Interposed between the two frames S and U are suitably disposed balls as W, adapted to allow movement of the second frame U relatively to the first S in a straight line truly parallel with the path of motion of the plunger L, the motion of the frame U being free from sliding friction. This is arranged in the example illustrated by three V-shaped grooves as U' cut in the inner face of the ring U and perpendicular to the longitudinal centre line of the flexible strips T and V and parallel with plunger L. Two similar grooves are cut in the inner face of the frame S and situated immediately opposite two of the grooves in the frame U. Opposite the third groove in the ring U a flat surface is provided on the frame S and is so disposed that when three spherical balls as W are fitted to the three grooves as U' in the frame U the flexible strips V and T attached to the frames U and S are parallel to each other. The frame U is constrained to move vertically upwards and is kept in close and constant contact with the three supporting balls by means of the force exerted by two springs X, each of which is tensioned between two of four transverse rods X' which lie parallel in eight grooves suitably placed in the outer faces of the frames U and S. A small pin $u^2$ pressed into a hole drilled in the inner periphery of the frame U comes into contact with the underside of the plate N carried by the plunger L and restricts the amount of vertical upward movement which the springs X can give to the frame U.

It will be seen that if a small amount of vertical upward movement is given to the measuring anvil L' this same movement will be transmitted through the frictionless plunger L and the frame U to the flexible strip V. The flexible strips T and V are, as explained, clamped together at the centre by the connecting member t', one of the plates of which is situated between them. Fixed to the connecting member t' are a pair of arms Y which are preferably so arranged as to be divergent at an angle of about 30°, while being slightly offset one from the other vertically to facilitate the fixing of metallic ribbons Y' carried thereby to a shaft Z, as will now be more fully described. Attached to the outer ends of the arms Y, one to each, are the two flexible metallic ribbons Y', the free ends of which are adapted to be clamped around a freely rotatable shaft Z or around a collar or pulley upon the same, in such a manner that on vertical angular movement of the arms Y, due to rocking of the connecting member $t'$, due in turn to a twisting movement of the flexible strips T and V, a rotary motion is imparted to the shaft Z. Mounted on the shaft Z is a pointer or the like $z'$ which is adapted to co-operate with scales $z^2$ arranged at the front of the mechanism. The scales $z^2$ may be carried by a scale plate $z^3$, pierced by a slot $z^4$ of arcuate form, the plate $z^3$ being supported on a central bearing co-axial with the shaft Z so that the scale plate $z^3$ is arcuately adjustable around the said shaft. The scales $z^2$ may be so arranged that some or all of the graduation lines thereon are not radial, as for instance at part $z^5$ of the scale, and that a radial pointer will cut at least one line at some point whatever the position of the pointer on the scale. By observing the point at which the pointer cuts a non-radial line one may obtain a more minute reading than is possible with a scale on which only radial lines are employed. The arrangement may be such that the moving pointer moves in the same plane as the scale; and by this means errors due to parallax are eliminated. In the example illustrated, this is effected by bending outwardly the end of the pointer $z'$ so that it enters the slot $z^4$. If desired, the adjustment of the scale may be effected by a rotatable rod $z^6$ or the like which is wholly or partially threaded and is adapted to co-operate with a correspondingly threaded fixed element $z^7$, so that, on rotation, the rod $z^6$ moves longitudinally, the end of the said rod being adapted to co-operate with a suitable abutment $z^8$ carried by the scale plate $z^3$ while a spring $z^9$ is provided to maintain the abutment $z^8$ in contact with the rod $z^6$.

Means are provided for lifting the plunger L when so desired, such means comprising for example a manually operable lever $l^2$ which is mounted on a freely rotatable shaft, which latter is adapted to carry an arm $l^3$ or arms so arranged that on depression of the lever said arm $l^3$ will abut against a stop $l^4$ or stops carried by the plunger L and will urge the same upwardly. Preferably a spring $l^5$ is associated with the arm $l^3$ serving to return the same and the lever $l^2$ to their initial positions on release of pressure on the said lever, and hence to allow return of the plunger L under the action of its springs P to its initial position.

A removable stop $l^6$ working in conjunction with the lifting mechanism may co-operate with another arm $l^7$ on the shaft which carries the arm $l^3$, so as to reduce the amount of lift that can be given to the plunger L, thus preventing shock being transmitted to the mechanism by reason of the plunger being allowed to fall through a large distance. When occasions arise where a large lift of the plunger L is necessary, the stop $l^6$ can be withdrawn, and in these circumstances special care should be exercised in lowering the plunger.

In operating the instrument, a standard piece is placed in position on the table C and the measuring anvil L' at the lower end of the plunger L is brought into contact with the top surface of the piece, the apparatus being adjusted until the correct reading is obtained with the scales $z^2$ and pointer $z'$. If necessary, an initial coarse adjustment may be made by adjusting the position of the indicating mechanism vertically with respect to the column B. After such coarse adjustment, the table C itself may then be accurately adjusted and if necessary a final adjustment may be made by moving the scale so that the pointer indicates the correct reading.

The movement of the pointer is obtained in the following manner. On upward movement of the plunger L due to insertion on the table C under the measuring anvil L' of the piece to be measured, the plate N at the upper end of the plunger L will be moved upwardly in a direction away from the pin $u^2$ in the second or movable frame U, which frame is then allowed to move upwardly with respect to the first frame S under the action of the coil springs X associated with both frames. Relative movement of the frames produces a twisting or angular movement of the flexible strips V and T with a consequent rocking of the connecting member $t'$ and a corresponding angular movement of the arms Y, which last movement results, as above explained, in a rotary motion of the shaft Z carrying the pointer $z'$, the pointer being thus moved relatively to the scales $z^2$ to indicate the thickness of the piece being measured.

After setting of the apparatus, by measurement of a standard piece, pieces to be compared with the standard may then be placed successively in position on the table and the readings taken, the previous setting of the instrument being, of course, retained. As each piece is inserted under the measuring anvil $l'$, the consequent angular or twisting movement of the flexible strips T and V with the associated rocking of the connecting member $t'$ is proportional to the vertical movement of the plunger L; and the movement of said connecting member is multiplied by means of the arms Y in such a manner as to give an appreciable movement of the pointer $z'$.

Preferably magnetic damping means are associated with the shaft Z carrying the pointer $z'$, so that on operation of the instrument the said pointer will assume its appropriate position with respect to the scale without undue oscillation. For example, there is provided a permanent magnet $z^{10}$ rigidly supported with its poles adjacent to a disc $z^{11}$ of electrical conducting material fixed upon and rotating with the shaft Z. The magnetic damping effort of the disc $z^{11}$ will be proportional to the speed of rotation of the shaft Z, being at its maximum when the pointer tends to turn most violently but being nil when the pointer is at rest.

Figure 6:
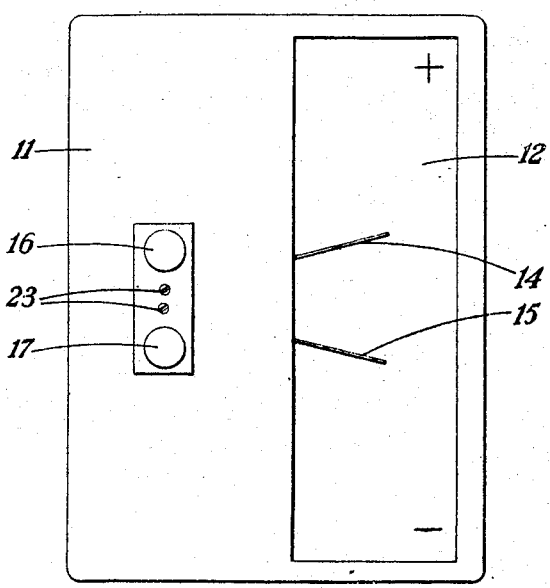
Figure 6 represents in front elevation a lid or cover adapted to be secured to the back plate to enclose the indicating mechanism.
Figure 7:
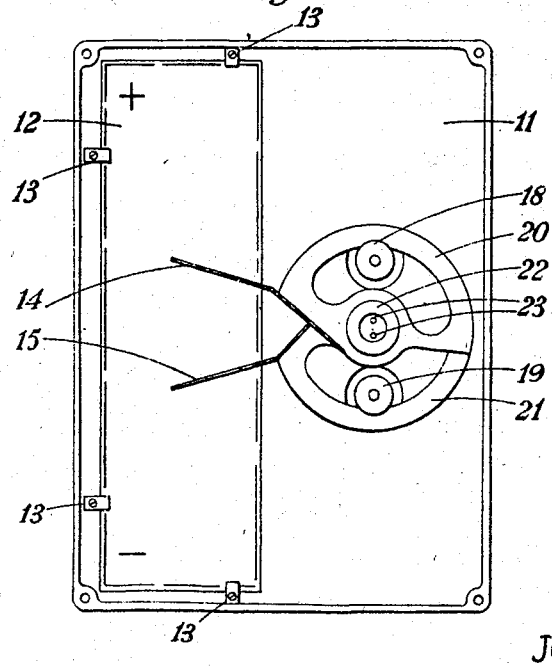
Figure 7 represents in elevation the inner side of the cover seen in Figure 6.

The back plate J whereon all the fixed parts of the indicating mechanism are mounted may conveniently be adapted to co-operate with a suitable cover so that the said backplate and cover together form a box or casing adapted to enclose all or most of the indicating mechanism, provision being made however for the measuring anvil L' to project therefrom. The said box or casing may have a front adapted to be positioned parallel with the said backplate J and closely adjacent to the scale-plate $z^3$, the said front being glazed to allow the scale $z^2$ to be seen through it. This cover may conveniently be constructed as represented in Figures 6 and 7. Its front 11 is partly cut away to provide a rectangular aperture adapted to accommodate a glass plate 12 of the same shape as the said aperture and of approximately the same size. The edges of the said aperture and the edges of the glass plate 12 are correspondingly bevelled in such a manner that the glass plate 12 is adapted to be pressed into the aperture with the bevelled edges of the glass plate 12 coinciding with the bevelled edges of the aperture, the arrangement being such that the glass plate 12 lies flush with the front 11, and thus flush with the forward edges of the four sides of the cover. In the cover illustrated, the glass plate 12 is pressed into the aperture from underneath or behind the front 11, and is held in position by four finger-clips 13 screwed to the under side of the said front.

Preferably the front 11 carries adjustable means for defining the required limits of tolerance, positive or maximum and negative or minimum, in the use of the gauge. In the example shown, the said adjustable means comprises two wire fingers 14, 15 adapted to lie under the glass plate 12 in close juxtaposition thereto, in such a position that when the cover is in place over the mechanism they will appear to cross the slot $z^4$ in the scale-plate $z^3$, the said wire fingers 14, 15, being adapted to be, by manual operation, moved along the scale $z^2$ with an angular motion approximately concentric with the angular motion of the pointer $z^1$. This manual operation of the wire fingers 14, 15 is effected by means of two knobs 16, 17 arranged to project from the front 11, each of the said knobs being rigidly secured upon a small spindle or pin which passes through a suitable bearing hole in the front 11 and is associated with friction gearing supported at the back or under side of the front 11. This friction gearing shown in Figure 7, comprises two small discs 18, 19 of thin sheet metal, rigidly secured upon the respective inner ends of the two spindles or pins upon the outer ends of which the knobs 16, 17 are secured. The discs 18, 19 are arranged respectively to bear frictionally upon members 20, 21 which are likewise of thin sheet metal and are of a shape approximating to a sector of a circle, these sector members 20, 21 being to a certain extent revolvable about a suitably formed axis member 22 which is attached to the underside of the front 11 by screws 23. The arrangement is such that by manual turning of the knob 16 the disc 18 rotates and by its friction upon the sector member 20 causes this sector member to revolve to some extent around the axis member 22 so that the wire finger 14 is caused to move upwards or downwards as desired to make a higher or lower positive limit of tolerance. Similarly by motion of the knob 17 with the disc 19 and the sector member 21, the wire finger 15 is caused to move upwards or downwards to mark a higher or lower negative limit of tolerance.

Instead of the above-described construction, an optical indicating system may be employed, in which case it is preferred that the arms Y, the flexible metallic ribbons Y', the shaft Z, and the pointer $z'$, be eliminated, a mirror or the like being mounted centrally of the flexible strips T and V, as for instance being affixed flat upon one of the plates of the connecting member $t'$. In such cases a suitable source of light would be incorporated in the device and arranged to project a beam of light on to said mirror, which beams, by means of a suitable system including one or more additional mirrors, would be projected on to a screen or the like to provide a reading.

What I claim and desire to secure by Letters Patent of the United States is:

1. A linear-dimension gauge comprising a measuring anvil, guiding means to render said anvil movable only along a fixed straight path, a movable frame which is movable along a fixed straight path parallel with the first-named fixed straight path, resilient means urging the said movable frame so to move, a stop disposed in the path of the said movable frame which stop is connected with the said measuring anvil, a flexible strip connected with the said movable frame, a second frame which is immovable, a second flexible strip connected with the said second frame, a connecting member which connects the two said flexible strips together and is rockable by distortion of the said strips, a spindle, a pointer carried by the said spindle and rotatable therewith, means associated with the said connecting member by which means the spindle and pointer are caused to rotate, and a table adapted to support the piece to be measured, which table is disposed beneath the said measuring anvil, the arrangement being such that normally the said stop holds the said movable frame immovable but if the said measuring anvil moves and the stop with it, the said movable frame is moved by the action of the said resilient means, causing distortion of the two said flexible strips and rocking of the connecting member to actuate the said means associated therewith whereby the pointer is caused to rotate, its angular movement being within very fine limits directly proportional to the linear movement of the said measuring anvil.

2. A linear-dimension gauge according to claim 1, wherein the said connecting member has operatively connected with it a pair of arms to each of which is attached a flexible belt whereby when the connecting member is caused to rock, movement is thereby imparted to the said pair of arms whereby a rotary movement is transmitted to a shaft carrying a pointer, by means of the flexible belts, and the pointer is thus caused to perform an angular movement.

3. A linear-dimension gauge according to claim 1, wherein the said pointer is adapted to co-operate with a suitable scale so that accurate measurements of the minute movements of the measuring anvil may be made.

4. A linear-dimension gauge according to claim 1, wherein the said movable frame moves upon ball bearings whereof the balls are accommodated in V-shaped grooves or like channels formed in the adjacent co-operating faces of the two frames, the said grooves being so arranged that the motion of the movable frame is maintained in a straight line.

5. A linear-dimension gauge according to claim 1, wherein the said resilient means comprise coiled springs tensioned between the movable frame and the immovable frame, the arrangement being such that the said springs tend both to pull the movable frame towards the immovable frame and also to urge the movable frame to move in relation to the immovable frame.

6. A linear-dimension gauge according to claim 1, wherein the said shaft or spindle carrying the pointer carries also a disc or the like of electrical conducting material arranged within the field of a magnet, in order that violent movement of the said disc and so of the said shaft or spindle may be magnetically damped or restrained.

7. A linear-dimension gauge according to claim 1, comprising a plunger to which the said measuring anvil is attached, which plunger is movable longitudinally, a channel arranged lengthwise of the plunger, anti-friction bearing balls suitably disposed in the said channel, and resilient means to constrain the plunger to lie upon the said balls.

8. A linear-dimension gauge according to claim 1, comprising a plunger to which the said measuring anvil is attached, which plunger is movable longitudinally, a channel arranged lengthwise of the said plunger, anti-friction bearing balls suitably disposed in the said channel, and resilient means to constrain the plunger to lie upon the said balls, and simultaneously to urge the plunger to move in the direction of the measuring anvil.

9. A linear-dimension gauge according to claim 1, comprising a plunger to which the said measuring anvil is attached, which plunger is movable longitudinally, a channel arranged lengthwise of the said plunger, anti-friction bearing balls suitably disposed in the said channel, resilient means to constrain the plunger to lie upon the said balls, and stops wherewith the plunger is adapted to co-operate in such a manner that the extent of the movement permitted to the plunger is limited.

10. A linear-dimension gauge according to claim 1, comprising a plunger to which the said measuring anvil is attached, which plunger is movable longitudinally, a channel arranged lengthwise of the sand plunger, anti-friction bearing balls suitably disposed in the said channel, resilient means to constrain the plunger to lie upon the said balls, and manually operated means, operatively connected with the plunger, and adapted to move the plunger against the effort of the resilient means associated therewith.

11. A linear-dimension gauge according to claim 1, comprising a plunger to which the said measuring anvil is attached, which plunger is movable longitudinally, a channel arranged lengthwise of the said plunger, anti-friction bearing balls suitably disposed in the said channel, resilient means to constrain the plunger to lie upon the said balls, manually operated means, operatively connected with the plunger and adapted to move the plunger against the effort of the resilient means associated therewith, and a stop or stops adapted to limit the extent of the movement permitted to the plunger, with which stop or stops the said manually operated means is adapted to co-operate.

12. A linear-dimension gauge according to claim 1, comprising a pair of arms associated with the said connecting member, and two flexible belts, each arm of the said pair having attached to its outer free end one end of one of the said belts, the other ends of the said belts being coiled around the said spindle carrying the said pointer, the arrangement being such that if the said arms are moved by reason of the rocking of the said connecting member, the said rocking is translated in a multiplied degree into a rotary motion of the said spindle.

13. A linear-dimension gauge according to claim 1, comprising a scale-plate wherewith the said pointer is adapted to co-operate, in which scale-plate is provided an arcuate slot upon the edge of which a suitable scale is marked, the said scale-plate lying in a plane adjacent to and parellel with the plane wherein the said pointer moves, and the end of the pointer being bent to enter the said slot and to lie in the same plane as the scale, so that reading errors due to parallax may be eliminated.

14. A linear-dimension gauge according to claim 1, comprising a scale-plate wherewith the said pointer is adapted to co-operate, the said scale-plate being revolvable around the said spindle carrying the said pointer, an abutment associated with the said scale-plate, a fixed element, a threaded rod adapted to pass through the said fixed element and to bear upon the abutment so as to cause the said scale-plate to revolve about the said spindle for the purpose of adjusting the scale in accordance with the position of the pointer, and a spring adapted to maintain the said abutment in contact with the said threaded rod.

15. A linear-dimension gauge according to claim 1, comprising a table adapted to support the piece to be measured, which table is arranged in a plane at right angles to the path in which the said measuring anvil moves, an externally threaded pillar supporting the said table, a fixed base wherewith the said externally threaded pillar is adapted to co-operate, a correspondingly internally threaded nut screwed upon the said externally threaded pillar and arranged between and parallel with the lower surface of the said table and the upper surface of the said fixed base, the arrangement being such that rotation of the said nut causes the said pillar and table to move towards or away from the said measuring anvil, means for providing a downward pull upon the pillar for the purpose of preventing backlash between the threads of the pillar and those of the nut, said means comprising a member associated with the pillar and springs disposed between a part of the fixed base and the said member, and means for locking the said pillar against movement.

16. A linear-dimension gauge according to claim 1, comprising a table adapted to support the piece to be measured, which table is arranged in a plane at right angles to the path in which the said measuring anvil moves, an externally threaded pillar supporting the said table, a fixed base wherewith the said externally threaded pillar is adapted to co-operate, a correspondingly internally threaded nut screwed upon the said externally threaded pillar and arranged between and parallel with the lower surface of the said table and the upper surface of the said fixed base, the arrangement being such that rotation of the said nut causes the said pillar and table to move towards or away from the said measuring anvil, means for providing a downward pull upon the pillar for the purpose of preventing backlash between the threads of the pillar and those of the nut, said means comprising a member associated with the pillar and springs disposed between a part of the fixed base and the said member, and means for locking the said pillar against movement, which latter means comprises a drawbolt accommodated in a suitable slot diametrically traversing the pillar, the said drawbolt also traversing a part of the fixed base, a nut on the end of the drawbolt, and a helical spring disposed around the drawbolt between the said nut on the end thereof and the outer surface of the said part of the fixed base tending to urge the drawbolt continually into locking engagement with the pillar, the arrangement being such that the drawbolt can be removed from locking engagement with the pillar by a sufficient degree of manual withdrawal, such withdrawal taking place against the action of the said helical spring, which spring automatically reutrns the drawbolt into locking engagement with the pillar as soon as the drawbolt is manually released.

17. A linear-dimension gauge according to claim 1, comprising a table to support the piece to be measured, which table is arranged in a plane at right angles to the path in which the said measuring anvil moves, an externally threaded pillar supporting the said table, a fixed base wherewith the said externally threaded pillar is adapted to co-operate, a correspondingly internally threaded nut screwed upon the said externally threaded pillar and arranged between and parallel with the lower surface of the said table and the upper surface of the said fixed base, the arrangement being such that rotation of the said nut causes the said pillar and table to move towards or away from the said measuring anvil, means for providing a downward pull upon the pillar for the purpose of preventing backlash between the threads of the pillar and those of the nut, said means comprising a member associated with the pillar and springs disposed between a part of the fixed base and the said member, and means for locking the said pillar against movement, which latter means comprises a drawbolt accommodated in a suitable slot diametrically traversing the pillar, the said drawbolt also traversing a part of the fixed base, a nut on the end of the drawbolt, and a helical spring disposed around the drawbolt between the said nut on the end thereof and the outer surface of the said part of the fixed base tending to urge the drawbolt continually into locking engagement with the pillar, the arrangement being such that the drawbolt can be removed from locking engagement with the pillar by a sufficient degree of manual withdrawal, such withdrawal taking place against the action of the said helical spring, which spring automatically returns the drawbolt into locking engagement with the pillar as soon as the drawbolt is manually released, and an eccentric to maintain the drawbolt temporarily in withdrawn position.

18. A linear-dimension gauge according to claim 1, comprising a backplate whereon all the fixed parts of its indicating mechanism are mounted, a suitable cover adapted to co-operate with the said backplate so that backplate and cover together form a box or casing adapted to enclose all or most of the indicating mechanism, provision being made however for the measuring anvil to project therefrom, said box or casing having a glass front arranged parallel with the said backplate and closely adjacent to the scale-plate, the said glass front being arranged flush with the forward edges of the four sides of the said cover, and being provided with adjustable means to define the required limits of tolerance in the use of the gauge.

JOHN LOXHAM.